(12) United States Patent (10) Patent No.: US 12,691,715 B2
Maack et al. (45) Date of Patent: Jul. 28, 2026

(54) SUPPORTING RING AND ASSEMBLY WITH A SUPPORTING RING

(71) Applicant: Vibracoustic SE, Darmstadt (DE)

(72) Inventors: Jan Ole Maack, Hamburg (DE);
Michael Morrison, Winsen (DE)

(73) Assignee: Vibracoustic SE, Darmstadt (DE)

( * ) Notice: Subject to any disclaimer, the term of this patent is extended or adjusted under 35 U.S.C. 154(b) by 127 days.

(21) Appl. No.: 18/225,974

(22) Filed: Jul. 25, 2023

(65) Prior Publication Data

US 2024/0025222 A1     Jan. 25, 2024

(30)     Foreign Application Priority Data

Jul. 25, 2022    (DE) .......................... 102022118600.8

(51) Int. Cl.
    *B60G 11/27*         (2006.01)
    *F16F 9/36*          (2006.01)
    *F16F 9/54*          (2006.01)

(52) U.S. Cl.
    CPC .............. *B60G 11/27* (2013.01); *F16F 9/362* (2013.01); *F16F 9/54* (2013.01); *B60G 2202/152* (2013.01)

(58) Field of Classification Search
    CPC ... B60G 11/27; B60G 2202/152; F16F 9/362; F16F 9/54; F16F 9/38; F16F 9/04
    See application file for complete search history.

(56) References Cited

U.S. PATENT DOCUMENTS

| | | | | |
|---|---|---|---|---|
| 5,180,146 A | * | 1/1993 | Schneider ............... | F16F 9/057 267/122 |
| 5,342,139 A | * | 8/1994 | Hoffman ................. | F16B 5/065 267/64.23 |
| 5,535,994 A | * | 7/1996 | Safreed, Jr. ............ | F16F 9/057 267/122 |
| 6,827,342 B2 | * | 12/2004 | Klitsch .................. | B60G 15/12 267/64.23 |
| 9,212,717 B2 | * | 12/2015 | Koeske ................... | F16F 9/057 |
| 10,260,590 B2 | * | 4/2019 | DeBruler ................ | F16F 9/084 |
| 11,320,019 B2 | * | 5/2022 | Yasukouchi ......... | B60G 13/005 |
| 11,685,214 B2 | * | 6/2023 | Lauzon .................. | B60G 15/12 267/64.23 |

(Continued)

FOREIGN PATENT DOCUMENTS

| | | |
|---|---|---|
| CN | 109312806 A | 2/2019 |
| CN | 211202711 U | 8/2020 |

(Continued)

OTHER PUBLICATIONS

DE-102017211139-A1 (machine translation) (Year: 2018).*

(Continued)

*Primary Examiner* — Jason D Shanske
*Assistant Examiner* — Joselynn Y Sliteris
(74) *Attorney, Agent, or Firm* — Reising Ethington P.C.

(57)     ABSTRACT

A supporting ring for an air-suspension strut. In embodiments, a support ring has a central longitudinal axis and includes a wall. In a radially inward direction, the wall has or forms an internal-abutment geometry that projects in the radial direction, and/or, in a radially outward direction, the wall has or forms an external-abutment geometry that projects in the radial direction.

14 Claims, 12 Drawing Sheets

(56)  References Cited

U.S. PATENT DOCUMENTS

| | | | | |
|---|---|---|---|---|
| 11,859,688 B2 * | 1/2024 | Bounds | .............. | B60G 17/0521 |
| 11,932,067 B2 * | 3/2024 | Lauzon | ................. | F16F 9/0454 |
| 2017/0219041 A1 | 8/2017 | Debruler | | |
| 2019/0344633 A1 * | 11/2019 | Fischbach | .............. | B60G 15/12 |

FOREIGN PATENT DOCUMENTS

| | | | | | |
|---|---|---|---|---|---|
| CN | 112727993 | A | | 4/2021 | |
| DE | 9109020 | U1 * | 11/1991 | | |
| DE | 10244776 | A1 | | 9/2003 | |
| DE | 102009027789 | A1 | | 1/2011 | |
| DE | 102017211139 | A1 * | 3/2018 | ............ | B60G 11/27 |
| DE | 102017209288 | A1 | | 12/2018 | |
| DE | 102017211139 | B4 † | 12/2020 | | |
| DE | 102019211605 | A1 | | 2/2021 | |
| DE | 102019214908 | A1 | | 4/2021 | |
| JP | 2013164092 | A * | 8/2013 | | |
| WO | 2021138173 | A1 | | 7/2021 | |

OTHER PUBLICATIONS

JP-2013164092-A (machine translation) (Year: 2013).*
DE-9109020-U1 (machine translation) (Year: 1991).*
German Office Action dated Mar. 10, 2023, for German Patent App. No. DE 10 2022 118 600.8 (w_machine_translation).
German Office Action, DE102022118600.8, mailed Jun. 23, 2025 (w_translation).
Machine translation for DE10244776.
Chinese Office Action corresponding to application 202310904255, dated Apr. 1, 2026, 14 pages.

* cited by examiner
† cited by third party

SUPPORTING RING AND ASSEMBLY WITH A SUPPORTING RING

CROSS-REFERENCE TO RELATED APPLICATIONS

This application claims priority to German Patent Application No. DE 10 2022 118 600.8, filed on Jul. 25, 2022, the contents of which are hereby incorporated by reference in its entirety.

TECHNICAL FIELD

The invention relates to a supporting ring and to an assembly with a supporting ring.

BACKGROUND

For air springs, for example for air springs of a land-based vehicle, a supporting ring serves to support a piston on a damper tube. A bellows of an air spring can roll on the piston. A plurality of individual parts of an air spring come together in the region of the supporting ring, and this usually takes place in the lower part of the damper, as seen in relation to the installed position.

A supporting plate is usually welded to the damper tube. For installation of an air spring, a supporting ring and an O ring are guided over the damper tube from above. The supporting ring holds the O ring at a specific height in relation to the damper tube. The piston is then fitted over the damper tube, likewise from above. The supporting plate provides the lower stop for the piston. The O ring then seals the piston on the damper in an air-tight manner in relation to the surroundings, so that it is not possible for any air to escape from the air spring. After this, a sleeve, which protects the air spring against the ingress of dirt, is likewise fastened on the supporting plate. For this purpose, the sleeve is expanded and, with the aid of an undercut, clamped behind the supporting plate. Such supporting rings require large material thicknesses, in some cases even solid material in the region of the damper tube, but this is disadvantageous for a desirable level of elasticity. If such a supporting ring with a large material thickness is manufactured from plastic, then the large material thickness requires long cooling periods and cycle times during the injection molding of the plastic, so that such a process is expensive. At the same time, large plastic wall thicknesses result in statistically distributed sink marks in the corresponding region, which can adversely affect reliable, air-tight sealing or can lead to inadmissible, high manufacturing tolerances. If low manufacturing tolerances are required, despite a large material thickness, then follow-up machining, or—in the case of a metal design—machining-type production, can be necessary, which results in excessively high production costs.

Conventional supporting rings are therefore worthy of improvement in respect of design, the avoidance of sink marks and possible manufacturing tolerances.

SUMMARY

An object of the invention is to provide a supporting ring and an assembly which are of improved design, and may overcome some or all of the aforementioned problems.

Aspects and features of the invention are disclosed herein.

The invention therefore discloses, inter alia, a supporting ring which may be used in connection with an air-suspension strut and has a central longitudinal axis and comprises a wall, wherein, in the radially inward direction, the wall has or forms an internal-abutment geometry, which projects in the radial direction, and/or, in the radially outward direction, the wall has or forms an external-abutment geometry, which projects in the radial direction.

The supporting ring according to the invention thus has abutment geometries against which adjacent components can butt, wherein the wall of the supporting ring is designed such that it can be an interface for a plurality of components at the same time. In the radially inward direction, for example a damper tube of an air-spring damper can butt against the internal-abutment geometry. In the radially outward direction, for example a piston of an air-suspension strut can butt against the external-abutment geometry and/or be supported thereon. In addition, the supporting ring can bear a sealing ring. The combination of all the functions and interfaces in a single supporting ring results in high standardization potential for the invention in terms of design and in the production and installation process. Ultimately, the supporting ring according to the invention overcomes the problems mentioned in the introduction by way of a straightforward design measure and, in the form of a functionally integrated component of an air-suspension strut, it serves to reduce material thickness, to reduce sink marks and to increase elasticity, with production costs being reduced at the same time.

The central longitudinal axis can pass through the supporting ring centrally in the axial direction. The radial direction is located perpendicularly thereto.

According to one conceivable refinement of the supporting ring according to an embodiment of the invention, the latter can be manufactured from a plastic material, such as from a thermoplastic. Such a material is cost-effective to process and provides for complex geometries as well as straightforward adaptability to geometrical requirements.

According to one configuration of the supporting ring according to the invention, the internal-abutment geometry can have or be formed from internal ribs and/or internal inwardly curved portions, wherein the internal ribs and/or internal inwardly curved portions can run in the axial direction and be brought into abutment against a damper tube of an air-suspension strut for radial-support purposes. As an alternative, or in addition, the external-abutment geometry can have or be formed from external ribs and/or external outwardly curved portions, wherein the external ribs and/or external outwardly curved portions run in the axial direction and can be brought into abutment against a piston of an air-suspension strut for radial-support purposes.

The ribs (internal ribs and external ribs) and/or curved portions (internal inwardly curved portions and external outwardly curved portions) run in the axial direction and extend in the radial direction, in order to form respective radial abutment regions for radial-abutment purposes. As seen in cross section, the internal inwardly curved portions therefore extend in the radial direction toward the central longitudinal axis or curve out in this direction, whereas the external outwardly curved portions extend in the radial direction away from the central longitudinal axis or curve out in this direction.

The ribs and/or curved portions allow abutment regions to be formed by way of straightforward geometries, wherein it is possible for the radial extent of the ribs and/or curved portions to be varied in the design process without any other part of the supporting ring being altered or having to be altered. For example, it is possible for the supporting ring to be adapted to different damper-tube diameters and/or piston diameters by straightforward shortening or lengthening of the ribs and/or curved portions in the radial direction, without this having a significant influence on, such as increasing, the wall thickness/the diameter of the wall or of a main ring of the wall and therefore the cycle times during plastic injection molding. This means that the supporting ring has increased design flexibility and the geometry has a direct influence on the economic viability of the same.

In addition, the supporting ring according to the invention can be fastened in an advantageous manner on account of the ribs and/or curved portions. It is known, in practice, that there are supporting rings which, during installation of an air spring, are not pushed against the damper tube by radial forces which can be generated by the radially external piston. This means that a firm fit of the known supporting ring is not guaranteed and, depending on tolerances, the supporting ring can rattle or move radially on the damper tube. In addition, the tolerances of a known supporting ring made of solid material are difficult to adjust, particularly the sink-mark-free surface is difficult to adjust, and the elasticity of such a supporting ring is not adjustable. In contrast, the ribs and/or curved portions result in the supporting ring having a small material thickness, which then provides for advantageous elasticity and therefore serves to compensate for tolerances—ribs and/or curved portions make it possible to achieve compensation for tolerances by way of deformation. In addition, the ribs and/or curved portions provide for reliable form-fitting and/or force-fitting fastening on the piston and/or damper tube. If ribs and/or curved portions are provided in the radially inward and radially outward directions, it is possible, during installation of the air spring, for the radially external ribs and/or curved portions to be pushed radially inward against the wall or the main ring. This radial force on the wall or the main ring gives rise to it being possible for the radially internal ribs and/or curved portions to be pushed against the damper tube. This increases the stability of the supporting ring on the supporting plate of the damper to a significant extent. Furthermore, pre-stressing is possible and contact pressure is adjustable to considerably better effect.

In addition, the ribs and/or curved portions mean that the supporting ring according to the invention advantageously achieves a longer service life. This is because the supporting ring according to the invention provides for a higher degree of overlap or coverage without the supporting ring breaking during installation or operation, as a result of which rupturing or bursting is prevented.

According to one conceivable refinement of the supporting ring according to the invention, the ribs and/or curved portions can run parallel to the central longitudinal axis, so that production molds are realized in a cost-effective manner and the supporting ring can be easily demolded, for example in the form of a plastic injection molding. This is because it is then possible for the supporting ring to be easily demolded in a linear movement along the central longitudinal axis. In addition, such ribs and/or curved portions serve to increase the geometrical elasticity of the supporting ring, so that a press fit between the damper and supporting ring is less dependent on manufacturing tolerances.

According to one conceivable refinement of the supporting ring according to the invention, the latter can be formed in one piece. It therefore comprises a single piece and is free of joined-together individual parts, for example being made of the same material throughout. The supporting ring can then be, for example, a plastic injection molding which can be produced in a cost-effective manner.

According to one conceivable refinement of the supporting ring according to the invention, the wall can have a main ring, from which the ribs and/or curved portions project. The main ring can be hollow-cylindrical or in the form of a hollow truncated cone. The ribs and/or curved portions and/or depressions may project exclusively from the main ring. The main ring can be interrupted in the circumferential direction by the curved portions or by depressions, since, as seen in cross section, the curved portions/depressions interrupt the circular path of the main ring. The ribs and/or curved portions make it possible for the main ring to have a constant material thickness in the circumferential direction. This means that the main ring can be of thin design, which reduces the amount of material used and increases the elasticity, without any risk of significant compromises in its stability and service life. There is therefore no need for the wall or the main ring to have a large material thickness. It is conceivable for the wall or the main ring (together with any possible curved portions or depressions) to have a constant material thickness in the circumferential direction, as a result of which weak points can be avoided.

According to one conceivable refinement of the supporting ring according to the invention, the latter has just a single wall or a single main ring. This makes it possible to reduce the amount of installation space required in the radial direction and to realize a component of low complexity. In addition, it is then possible for the abutment geometries to project in each case from a single wall or a single main ring, which results in increased elasticity. This refinement advantageously avoids radially overlapping walls or double walls.

According to one conceivable refinement of the supporting ring according to the invention, at least three radially internal ribs and/or curved portions and/or three radially external ribs and/or curved portions can be formed, in order to ensure that the supporting ring is held reliably. The corresponding ribs and/or curved portions may be arranged equidistantly in relation to the central longitudinal axis.

According to one conceivable refinement of the supporting ring according to the invention, the radially internal ribs and/or curved portions can run over the entire axial extent of the wall or of the main ring. This makes it possible to form long abutment regions and to prevent tilting in relation to the central longitudinal axis.

According to a further refinement of the supporting ring according to the invention, the latter can have a latching structure, for example a toothing formation or a toothed ring, which is arranged continuously or in sections in the circumferential direction around the central longitudinal axis, projects in the axial direction and/or radial direction and can engage in a piston. The latching structure can be arranged on a supporting flange of the supporting ring, for example on an end surface of the supporting flange. The latching structure advantageously serves as a device to prevent rotation of the piston in relation to the supporting ring. This can reliably prevent the situation where the piston rotates as a result of external influences (e.g. torsion by way of a chassis). In addition, moments can be reliably transmitted in this way.

According to a further refinement of the supporting ring according to the invention, the latter can have a receiving flange, which extends in the radial direction and forms an abutment surface for at least one sealing ring. This allows the sealing ring to rest reliably on a surface of the receiving flange and to be held on the supporting ring. The sealing ring can seal the piston and/or an air-spring volume there in relation to the surroundings, so that it is not possible for any air to escape from the air spring. The abutment surface can be designed in the form of a circular ring, for example between a radially internal edge circle and a radially external edge circle. It is conceivable for the receiving flange to extend radially inward from the wall or the main ring. This makes it possible to reduce the amount of radial space required on the outer circumference in relation to the wall or the main ring in order to receive the piston or to allow for small-diameter pistons. It is possible here for the receiving flange to axially overlap or cover over, such as fully, the ribs and/or curved portions on the inner circumference. By means of the receiving flange, the position of the sealing ring is held reliably when the air spring is in the installed position.

According to one conceivable refinement of the supporting ring according to the invention, the radially internal ribs and/or curved portions can merge into the receiving flange in the axial direction. The receiving flange is therefore backed axially, and supported reliably, by the radially internal ribs and/or curved portions. Such a design allows for high sealing forces.

According to a further refinement of the supporting ring according to the invention, the receiving flange can have at least one separating device, which projects in the axial direction and separates a radially external sealing-ring mount from a radially internal sealing-ring mount. The sealing-ring mounts can therefore be radially adjacent to one another. The at least one separating device therefore forms, with the receiving flange, the radially external sealing-ring mount, which is L-shaped and can be open in the radially outward direction. In the same way, the at least one separating device forms, with the receiving flange, the radially internal sealing-ring mount, which is L-shaped and can be open in the radially inward direction. It is therefore possible for sealing rings arranged there to butt with sealing action against a radially adjacent surface, for example against the piston and/or damper tube. The at least one separating device can be, for example, an annular crosspiece which runs in the circumferential direction in relation to the central longitudinal axis, either continuously or in segmented fashion. If the difference in diameter between the damper tube and the piston should be too large, a solution involving two sealing rings each with a small profile thickness avoids the presence of a single sealing ring with a considerably larger profile thickness in order to bridge the difference in diameter. It can be a problem with sealing rings that increasing profile thickness brings with it a progressively smaller selection of available standard rings. Specially manufactured sealing rings with thick profile thicknesses, however, are costly. It is therefore advantageous if standard rings can be used. If a plurality of sealing rings are arranged in position, the at least one separating device also avoids the situation where the individual sealing rings slip, for example because the sealing rings are separated from one another by the separating device and do not butt against one another. It is conceivable both to have a single separating device, which forms the two sealing-ring mounts; as an alternative, it is conceivable to have a plurality of such separating devices, such as two separating devices. The separating devices can be arranged radially adjacent to one another and/or can delimit a radial interspace, for example a radial empty space, between them. It is possible for the radially external separating device, as explained above, to form the radially external sealing-ring mount and/or for the radially internal separating device, as explained above, to form the radially internal sealing-ring mount. By means of a plurality of separating devices, it is possible to compensate for a large difference in diameter between the damper tube and the piston and/or to use sealing rings of a smaller profile thickness, as compared with the solution which uses only a single sealing ring or the solution which provides two sealing rings, but just one separating device. If two sealing rings are provided, the sealing rings can have identical profile thicknesses, but different diameters.

According to a further refinement of the supporting ring according to the invention, the latter can have a supporting flange, which extends in the radial direction and of which the radial edge can have a sleeve of the air-suspension strut engaging around it. The supporting flange can extend radially outward from the wall or the main ring. The sleeve can then be fastened on the outer edge of the supporting flange. The advantage with this is that, in contrast to the sleeve being installed directly on the damper, installation of the sleeve on the supporting flange can take place independently of a damper or the suppliers thereof, as a result of which development costs are lowered and the need for coordination between producers is reduced. The invention allows the interfaces to be standardized and easily defined. The supporting flange makes it possible for the supporting ring to be supported in the axial direction, for example on a supporting plate.

According to one conceivable refinement of the supporting ring according to the invention, the wall or the main ring can have an internal diameter of at least 58 mm and/or an external diameter of at most 66 mm Against the background of the invention, in particular of the ribs and/or curved portions, these dimensions solve the problem of different damper-tube diameters by way of a supporting ring which can be adapted extremely easily. The internal diameter can always be selected to be larger than the largest diameter of a damper which is typical for this application. It is thus possible for the wall or the main ring for different air-spring projects to be used with different dampers of different diameters by it being possible for the radial extent of the radially internal and/or radially external ribs and/or curved portions to be adapted to the given diameter ratio between the piston and damper tube without the wall or the main ring having to be altered in the process. In addition, it is thereby possible to counter large tolerance diameters without impairment of the firm fit and, at the same time, prevention of circumferential stressing due to poor tolerances in the wall or the main ring. For a damper diameter of 45 mm to 58 mm, it is advantageous that just one sealing ring has to be used. Accordingly, the invention is based on a flexible basic design which can be used for different damper diameters.

According to a further refinement of the supporting ring according to the invention, on the outer circumference, the supporting ring can have depressions, which run in the axial direction. The depressions run in the axial direction and extend in the radial direction, for example radially inward, wherein the depressions do not form a radial abutment region. It is possible for the depressions to be arranged on the wall or to be formed by the wall and/or to be of groove-like design. It is also possible for the depressions to be arranged on the main ring and to interrupt the circular path thereof; the depressions constitute deviations, for example from the circular path of the main ring. They therefore reduce the circumferential stiffness of the supporting ring. The depressions therefore allow the supporting ring to move flexibly and to compensate for tolerances in relation to the surrounding components. The depressions advantageously do not form radial abutment regions.

According to one conceivable refinement of the supporting ring according to the invention, the external ribs can be arranged in the depressions, the external ribs may project out of the depressions in the radial direction and, in the preinstallation state, the external ribs may project beyond an external diameter of the wall or of the main ring in the radial direction. In embodiments, the corresponding depression or the corresponding rib on the outer circumference may not be backed in the radially inward direction. It is therefore possible for example for an abutment geometry to be absent there. The depression, which results in flexibility, means that the ribs arranged there on the outer circumference can easily be pushed in in the radially inward direction when the piston is being installed, as a result of which they serve both to center the piston in relation to the damper tube and to hold the piston reliably.

According to one conceivable refinement of the supporting ring according to the invention, it is possible for the ribs on the inner circumference not to be backed in the radially outward direction. It is therefore possible for example for a radially external abutment geometry to be absent there. The wall, which itself can form a radial abutment region, can be sufficient to hold for example a piston reliably.

According to a further refinement of a supporting ring according to the invention, it is possible for the depressions to be open, such as fully open, at at least one of their axial ends and/or to be designed to be free of undercuts in the axial direction. As far as the curved portions are concerned, provision can be made for these to be open, such as fully open, at at least one of their axial ends and/or to be designed to be free of undercuts in the axial direction. The supporting ring is therefore easy to manufacture, for example in the form of an injection molding, since complicated geometries and undercuts, which require complicated production molds, are dispensed with.

According to a further refinement of the supporting ring according to the invention, a distance can be formed in the axial direction between, on the one hand, the internal inwardly curved portions and/or the external ribs and/or the depressions and, on the other hand, an axial wall end. The axial wall end can be located at the axial height of the receiving flange or can be formed thereby. If the external ribs and/or the depressions were to run as far as the axial wall end, then it would no longer be possible for the abutment surface for the at least one sealing ring on the receiving flange to be circular at the outer circumference. A receiving flange in the form of a circular ring, on the other hand, forms a reliable abutment surface for the at least one sealing ring.

According to a further refinement of the supporting ring according to the invention, it is possible either for the respective internal ribs or internal inwardly curved portions to be in alignment in the radial direction with corresponding external ribs or for the respective internal ribs or internal inwardly curved portions to be offset equidistantly in the circumferential direction in relation to corresponding external ribs, for example not to be in alignment therewith. For an aligned design, a radially stiff supporting ring can be produced, since a radial force can be transmitted directly from the external ribs to the internal ribs or internal inwardly curved portions. The form fit can be reliably achieved. For a non-aligned design, a supporting ring which is considerably more compliant in the radial direction can be realized, since a press fit with the damper and/or piston can be more flexible and tolerances in relation to the surrounding components can be better compensated for. An angular extent can be provided between adjacent internal ribs or internal inwardly curved portions and an identical angular extent can be provided between adjacent external ribs or external outwardly curved portions, wherein the two angular extents can overlap by half an angular extent in the circumferential direction.

According to one conceivable refinement of the supporting ring according to the invention, it is possible for the curved portions and/or depressions to run, as seen in cross section, in a V-shaped manner, in the form of a circle arc, in a rectangular manner or in the form of a trapezoid. At least one side of the rectangle or of the trapezoid can follow a circular path around the central longitudinal axis, so as to realize a large radial-abutment surface for the damper tube. The cross-sectional shape can influence the circumferential flexibility, the aforementioned cross-sectional shapes being given in order of increasing levels of stiffness.

According to one conceivable refinement of the supporting ring according to the invention, the latter is free of internal ribs. This is because the internal inwardly curved portions can project radially inward to the extent where they butt directly against the damper and can support the same. In this case, there is no need for any internal ribs.

According to one conceivable refinement of the supporting ring according to the invention, the latter is free, on the outer circumference, of a radially projecting external-abutment geometry on the wall. This is because the internal-abutment geometry can be sufficient for butting directly against the damper and for being able to be supported against the same. There is then no need for an external-abutment geometry. On the outer circumference, it is possible for the wall to have a surface of rotation in the mathematical sense, for example a cylinder surface or a truncated-cone surface.

Also conceivable in the context of the invention is a supporting ring arrangement comprising a supporting ring according to the disclosure and at least one sealing ring according to the disclosure. The advantages already described above in relation to the supporting ring and sealing ring are also achieved, in an analogous manner, for the supporting-ring arrangement, and reference is hereby made to these advantages.

The invention also proposes an assembly comprising a supporting ring according to the disclosure, at least one sealing ring according to the disclosure and an air-suspension strut with a damper tube, wherein the supporting ring butts against the damper tube by way of the abutment geometry. The supporting ring can be pressed against the damper tube, the invention providing for this pressing action to take place in a rotationally fixed manner. For the rest, the advantages which have already been described above in relation to the supporting ring are also achieved, in an analogous manner, for the assembly, and reference is hereby made to these advantages.

Also conceivable in the context of the invention is a supporting-ring set comprising at least two supporting rings according to the disclosure, the supporting rings comprising identical external geometries for the wall and/or the supporting flange and differing internal geometries for the wall. The supporting-ring set straightforwardly provides the design-related advantage of the supporting ring according to the invention. The abutment geometries allow for an external diameter to remain identical, whereas the radially internal geometry can be adapted to a damper tube. In the same way, the abutment geometries allow for the internal diameter to remain identical, whereas the radially external geometry can be adapted. In both cases, the wall can be excluded from adaptation. The respective supporting ring is, in principle, freely scalable in the radial direction on account of the abutment geometries. Otherwise, the advantages which have already been described above in relation to the supporting ring are also achieved, in an analogous manner, for the supporting-ring set, and reference is hereby made to these advantages.

Production should be understood to mean a process by which a component is manufactured. Installation should be understood to mean a process by which the supporting ring is secured at or in its intended location for operation, for example on the damper tube and/or in the piston. This is preceded in time by the pre-installation state. The supporting ring is described in the non-loaded state, reference being made separately to cases involving loading.

Further features, details and advantages of the invention can be gathered from the wording of the claims and also from the following description of exemplary embodiments with reference to the drawings, in which:

DETAILED DESCRIPTION

In the figures, like or corresponding elements are each denoted by like reference signs and therefore, if not expedient, are not described anew. Features which have already been described are not described anew, in order to avoid repetition, and can be applied to elements with like or corresponding reference signs, unless explicitly indicated to the contrary. What is disclosed throughout the description can be transferred analogously to like components with like reference signs or like component descriptions. It is also the case that the positional information selected in the description, e.g. above, below, to the side, etc., relates to the figure directly described and illustrated and, in the case of the position being changed, can be transferred analogously to the new position. Furthermore, it is also possible for individual features or combinations of features from the different exemplary embodiments shown and described to constitute independent or inventive solutions or solutions according to the invention.

A radial direction R extends from a central longitudinal axis Z, in which an axial direction A is located. A circumferential direction U extends around the central longitudinal axis Z.

Figure 1:
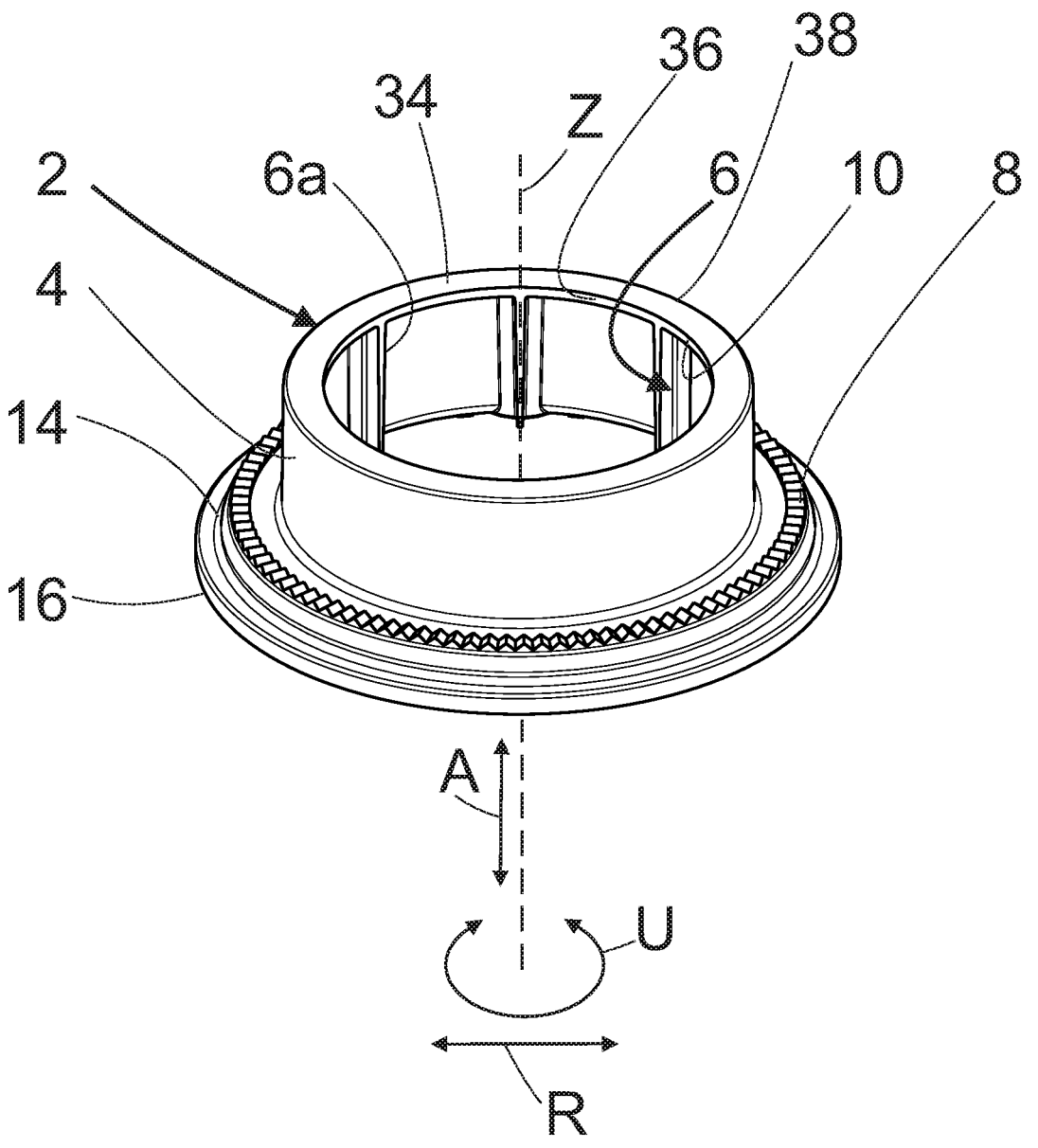
FIG. 1 shows a perspective view of a first embodiment of a supporting ring.

FIG. 1 shows a single-piece supporting ring 2 in the form of a plastic injection molding for an air-suspension strut 100. The central longitudinal axis Z extends centrally through the supporting ring 2 in the axial direction A. The supporting ring 2 comprises a single wall 4, which is adjoined axially at one end by a receiving flange 10 and axially at the other end by a supporting flange 14. The wall 4 comprises a main ring 32, which is illustrated by way of example in FIG. 4, wherein the wall 4 or the main ring 32 can have an internal diameter of at least 58 mm and/or an external diameter of at most 66 mm.

On the outer circumference, the wall 4 has a cylindrical surface of rotation in the mathematical sense. On the inner circumference, however, the wall 4 has an internal-abutment geometry 6, which projects in the radial direction R and runs in the axial direction A. This internal-abutment geometry 6 has internal ribs 6a and is formed entirely of these ribs. The internal ribs 6a project in the radial direction R and run in the axial direction A, it being possible for them to be brought into abutment against a damper tube 102 of an air-suspension strut 100 for radial-support purposes. To this end, they form radial abutment regions. The internal ribs 6a run parallel to the central longitudinal axis Z and are arranged equidistantly in relation to the central longitudinal axis Z. The internal ribs 6a run over the entire axial extent of the wall 4, wherein they are not backed in the radially outward direction and/or are free of an external-abutment geometry 18.

The receiving flange 10 extends radially inward in the radial direction R from the wall 4. It forms an abutment surface 34 for at least one sealing ring 12, 12a, 12b, in the form of a circular ring, between a radially internal edge circle 36 and a radially external edge circle 38. The receiving flange 10 overlaps or covers over the internal ribs 6a axially, wherein the internal ribs 6a also merge into the receiving flange 10 in the axial direction A, in order to back the same and support it reliably.

The supporting flange 14 extends radially outward in the radial direction R from the wall 4. A latching structure in the form of a toothing formation 8, which is designed in the form of a continuous toothed ring, is provided on an end surface of the supporting flange 14, this end surface being oriented in the axial direction A. The toothing formation is arranged in the circumferential direction U around the central longitudinal axis Z and can be brought into engagement with a piston 106 of an air-suspension strut 100. The radial edge 16 of the supporting flange 14 can have a sleeve 104 of an air-suspension strut 100 engaging around it.

Figure 2:
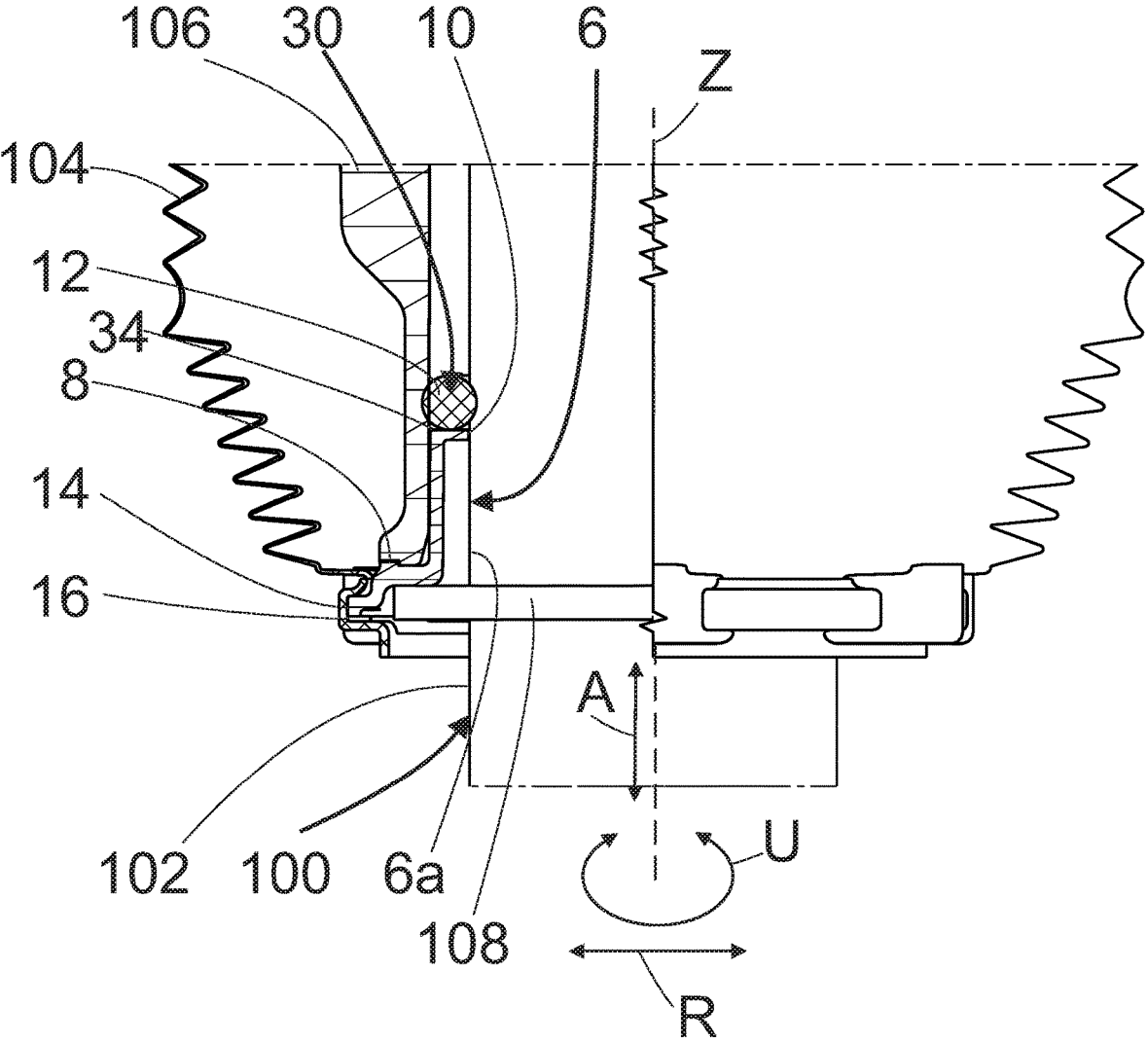
FIG. 2 shows a longitudinal-section view of an assembly with a supporting ring according to FIG. 1.

FIG. 2, then, shows a half-section view of an assembly with the supporting ring 2 of FIG. 1, this corresponding to an installed position. A supporting plate 108 is fastened on the damper tube 102. The supporting ring 2 is supported on this supporting plate 108 in the axial direction A via the supporting flange 14. In the radially inward direction of the supporting ring 2, the internal ribs 6a butt against the damper tube 102, and may be pressed against the same. In the radially inward direction of the supporting ring 2, the piston 106 butts against the wall 4, and may be pressed against the same. In addition, the piston 106 is supported against the supporting flange 14 in the axial direction A and forms a form fit with the toothing formation 8. The sleeve 104 engages around the radial edge 16 of the supporting flange 14 at the outer circumference. The receiving flange 10 bears a sealing ring 12. The sealing ring 12 butts with sealing action against the abutment surface 34 in the axial direction A, against the damper tube 102 in the inwardly oriented radial direction R and against the piston 106 in the outwardly oriented radial direction R. The supporting ring 2 and the sealing ring 12 form a supporting-ring arrangement 30.

11                                                                                              12

Figure 3:
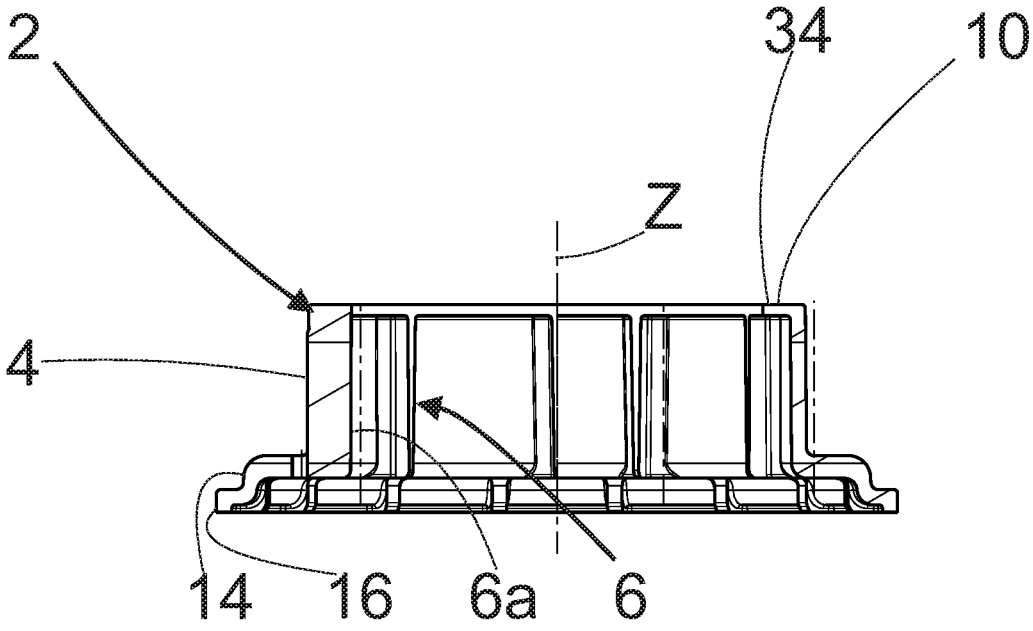
FIG. 3 shows a longitudinal-section view of a further embodiment of a supporting ring.

FIG. 3 shows a longitudinal-section view of a further supporting ring 4, which differs from the supporting ring of FIGS. 1 and 2 in that no toothing formation 8 is provided.

Figure 4:
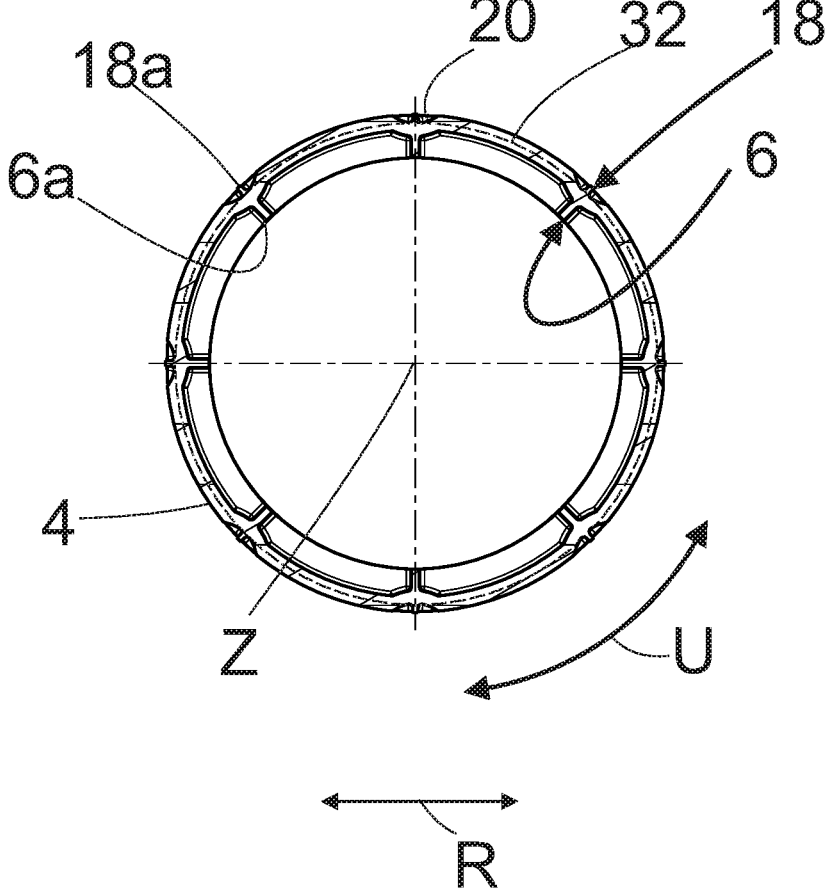
FIG. 4 shows a cross-sectional view of a further embodiment of a supporting ring.
Figure 5:
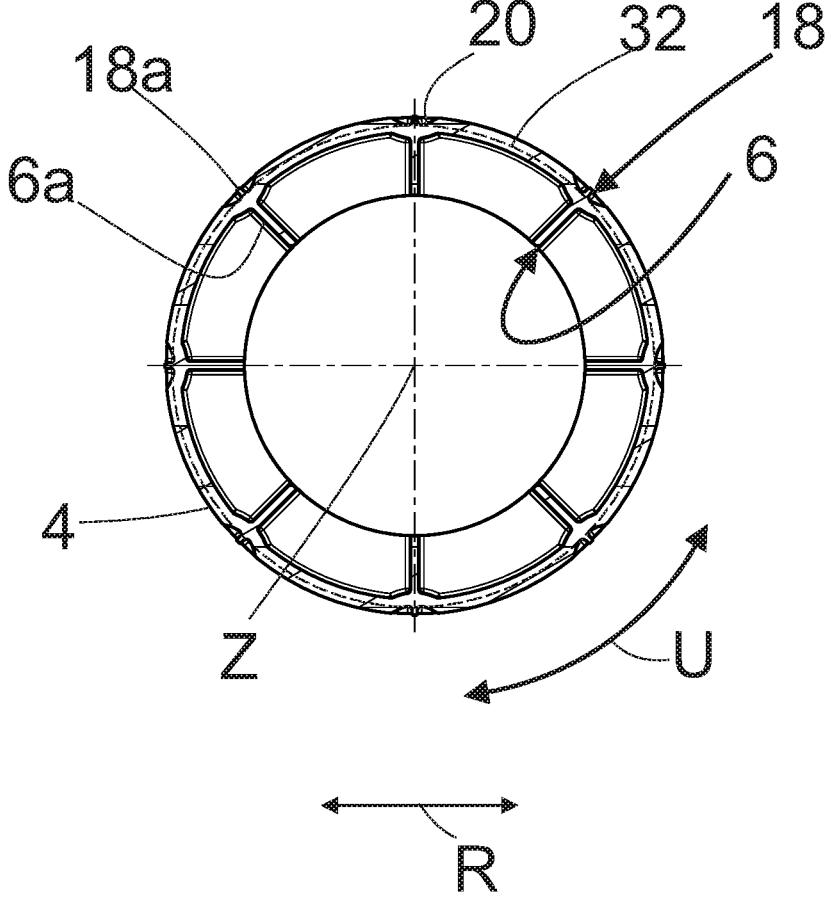
FIG. 5 shows a cross-sectional view of a further embodiment of a supporting ring.

FIGS. 4 and 5 show the concept of the scaling of abutment geometries with reference to two cross-sectional views of two supporting rings 4. First of all, it can be seen that the wall 4 has the main ring 32, which is illustrated by dashed lines and is hollow-cylindrical. This main ring is interrupted in the circumferential direction U by groove-like depressions 20 in the wall 4. The depressions 20 on the outer circumference run in the axial direction A and extend radially inward in the radial direction R. They are arranged equidistantly around the central longitudinal axis Z and are in alignment with the internal ribs 6*a* in the radial direction R. The depressions 20 do not extend radially inward beyond the internal ribs 6*a* and do not form radial abutment regions. As seen in cross section, the depressions 20 are in the form of circle arcs. It can be seen that the wall 4 or the main ring 32, together with the depressions 20, has a constant material thickness in the circumferential direction U.

In addition to the internal-abutment geometry 6, the supporting rings 4 of FIGS. 4 and 5, then, also have an external-abutment geometry 18, which projects in the radial direction R. This external-abutment geometry 18 has external ribs 18*a* and is formed entirely of these ribs. The external ribs 18*a* project in the radial direction R and run in the axial direction A, it being possible for them to be brought into abutment against a piston 106 of an air-suspension strut 100 for radial-support purposes. To this end, they form radial abutment regions. The external ribs 18*a* run parallel to the central longitudinal axis Z and are arranged equidistantly in relation to the central longitudinal axis Z. The external ribs 18*a* are in alignment in the radial direction R with the internal ribs 6*a*. It can be seen that the external ribs 18*a*, in addition, are arranged in the depressions 20 and project out of the depressions 20 in the radial direction R.

The walls 4 or the main rings 32 of the supporting rings 2 of FIGS. 4 and 5 have identical diameters. In addition, the external-abutment geometries 18 are identical. In contrast, the internal-abutment geometries 6 differ. This is because the diameter can remain identical, whereas the radially internal geometry or internal-abutment geometry 6 can be adapted to a damper tube 102 by shortening or lengthening in the radial direction. The wall 4 is excluded here from adaptation. The respective supporting ring 2 is therefore, in principle, freely scalable in the radial direction R on account of the abutment geometries 6, 18. Whereas the supporting ring 4 according to FIG. 4 is designed for a damper tube 102 of relatively large diameter, the supporting ring 4 according to FIG. 5 is designed for a damper tube 102 of smaller diameter, wherein it is advantageously possible that each of the supporting rings 4 can be based on the respectively other one in the design process.

Figure 6:
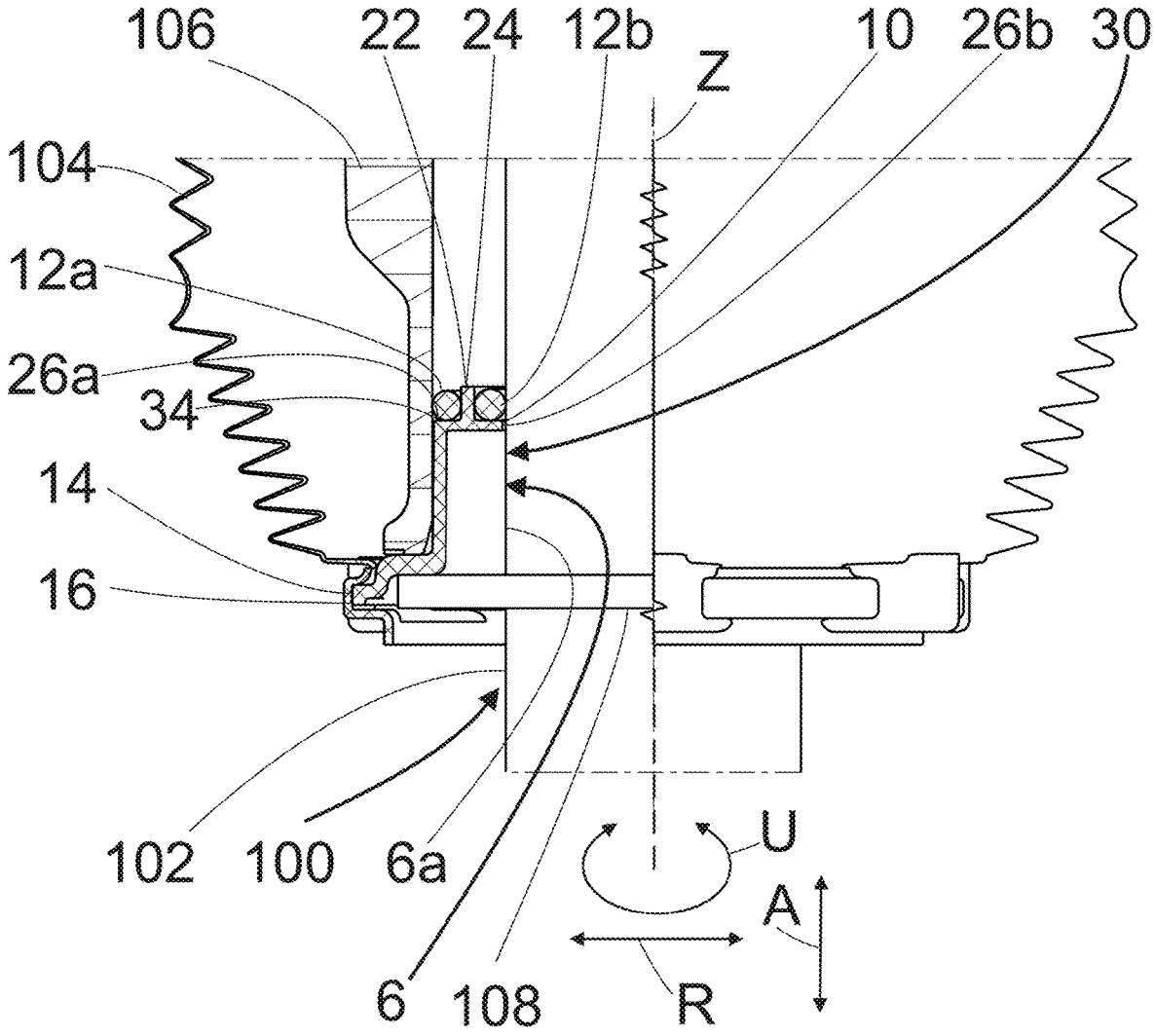
FIG. 6 shows a longitudinal-section view of an assembly with a further embodiment of a supporting ring.

The view in FIG. 6 is basically similar to that in FIG. 2, although in this case the internal-abutment geometry 6 has been lengthened in the radial direction R in order to correspond to the thinner-diameter damper tube 102. In this case, in addition, there is a large difference in diameter between the damper tube 102, on the one hand, and the piston 106, on the other hand. In order to avoid, then, a single sealing ring with a large profile thickness, the receiving flange 10 has a separating device 22, which projects in the axial direction A, is designed in the form of an annular crosspiece 24 and separates a radially external sealing-ring mount 26*a* from a radially internal sealing-ring mount 26*b*. The sealing-ring mounts 26*a*, 26*b* are radially adjacent to one another and are each L-shaped, wherein the radially external sealing-ring mount 26*a* is open in the radially outward direction and the radially internal sealing-ring mount 26*b* is open in the radially inward direction. Each sealing-ring mount 26*a*, 26*b* receives a sealing ring 12*a*, 12*b*, which each have a considerably smaller profile thickness than a single sealing ring, which would otherwise be necessary. The sealing ring 12*a* butts with sealing action against the abutment surface 34 in the axial direction A, against the annular crosspiece 24 in the inwardly oriented radial direction R and against the piston 106 in the outwardly oriented radial direction R. The sealing ring 12*b* butts with sealing action against the abutment surface 34 in the axial direction A, against the damper tube 102 in the inwardly oriented radial direction R and against the annular crosspiece 24 in the outwardly oriented radial direction R. The annular crosspiece 24 runs continuously in the circumferential direction U in relation to the central longitudinal axis Z.

Figure 7:
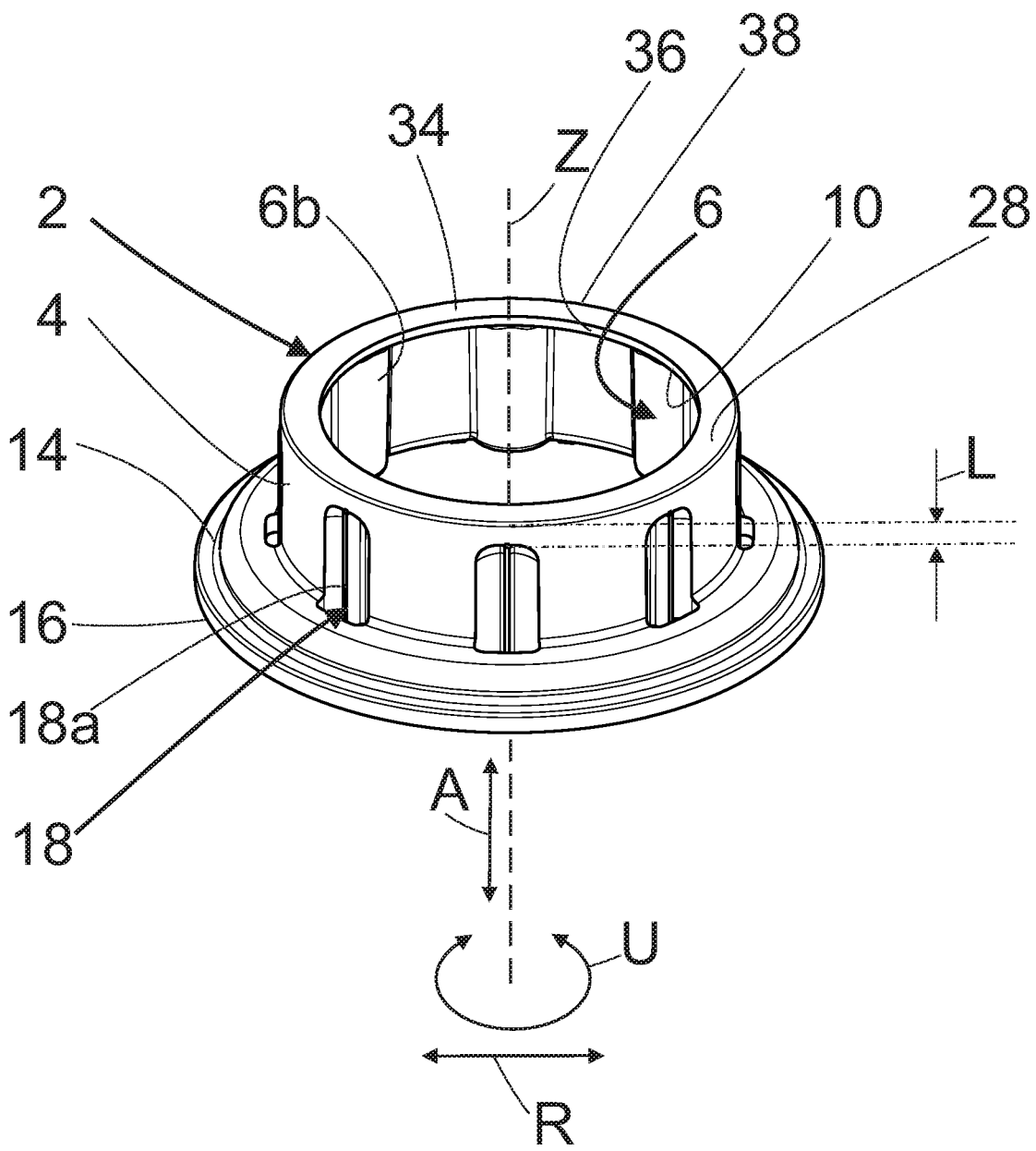
FIG. 7 shows a perspective view of a further embodiment of a supporting ring.

The view in FIG. 7 is basically similar to that in FIG. 1, although in this case the internal-abutment geometry 6, rather than having internal ribs, has internal inwardly curved portions 6*b* and is formed entirely of these curved portions. The internal inwardly curved portions 6*b* project in the radial direction R toward the central longitudinal axis Z, or curve in this direction, and run in the axial direction A, it being possible for them to be brought into abutment against a damper tube 102 of an air-suspension strut 100 for radial-support purposes. To this end, they form radial abutment regions. The internal inwardly curved portions 6*b* run parallel to the central longitudinal axis Z and are arranged equidistantly in relation to the central longitudinal axis Z. As seen in cross section, the internal inwardly curved portions 6*b* are in the form of circle arcs. The supporting ring 4 is free of internal ribs. The supporting ring 4 according to FIG. 7, in addition, has an external-abutment geometry 18 in the form of external ribs 18*a*, wherein the internal inwardly curved portions 6*b* and the external ribs 18*a* are in alignment in the radial direction R.

The internal inwardly curved portions 6*b* and the external ribs 18*a* do not run over the entire axial extent of the wall 4. Rather, a distance L is formed in the axial direction A, on the outer circumference, between the internal inwardly curved portions 6*b* and also the external ribs 18*a*, on the one hand, and an axial wall end 28, on the other hand. The axial wall end 28 is defined by the receiving flange 10. This means that the abutment surface 34 for the at least one sealing ring 12, 12*a*, 12*b* on the receiving flange 10 is circular at the outer circumference, that is to say on the radially external edge circle 38. In addition, no toothing formation 8 is provided.

Figure 8:
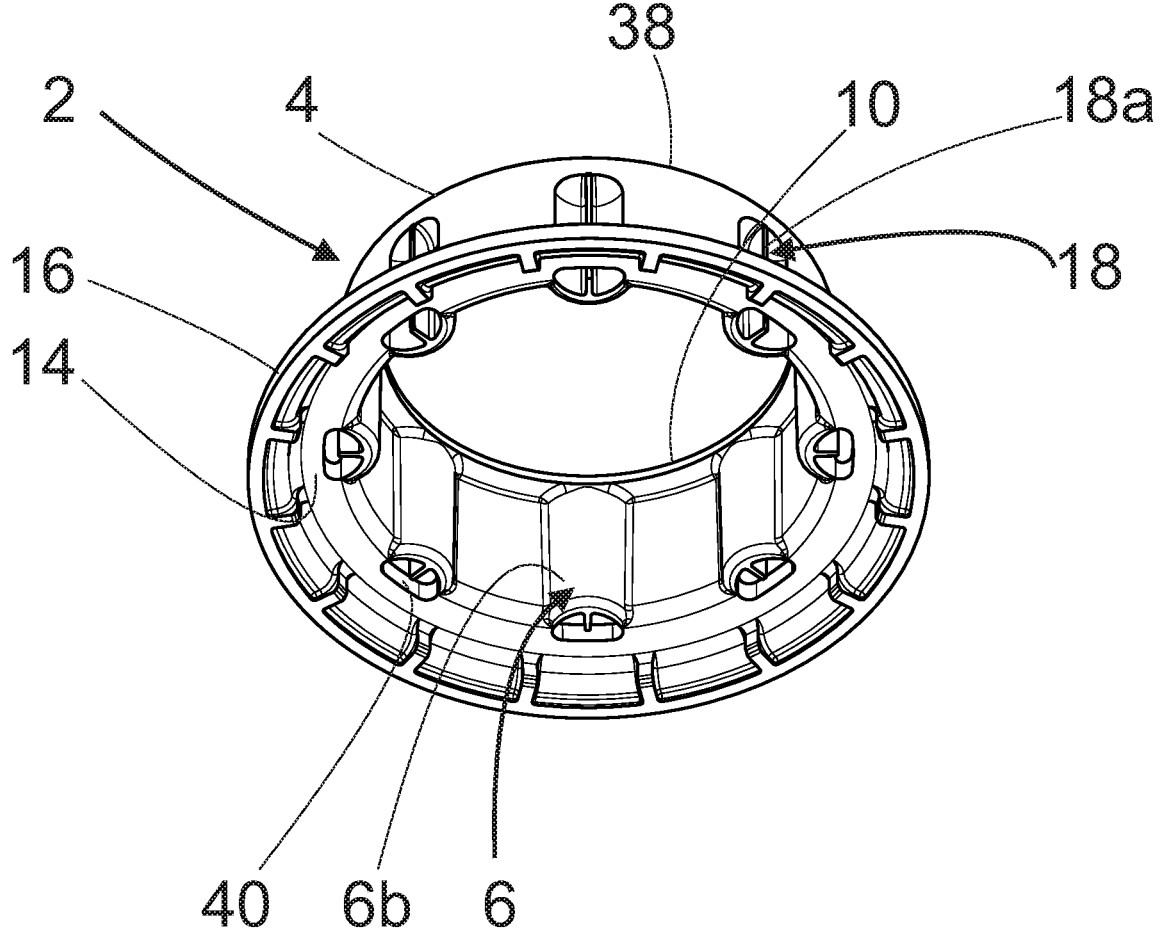
FIG. 8 shows a further perspective view of the supporting ring according to FIG. 7.

It can be seen from FIG. 8, which shows a bottom view of the supporting ring 2 of FIG. 7, that the internal inwardly curved portions 6*b* are fully open at their respective axial end 40 and are designed to be free of undercuts.

Figure 9:
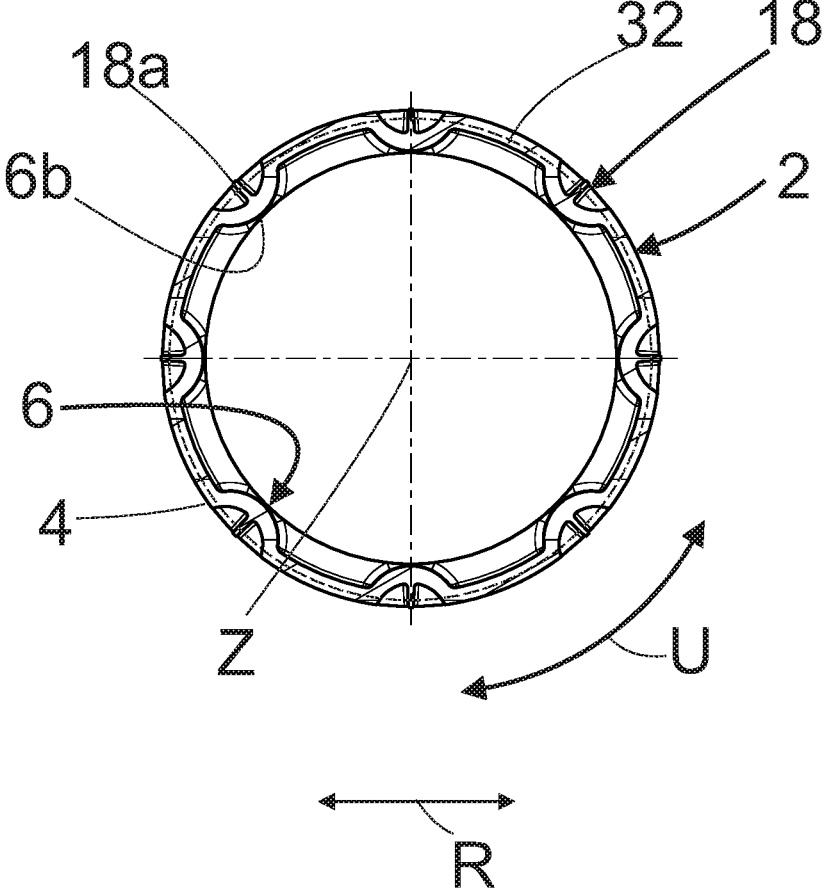
FIG. 9 shows a cross-sectional view of the supporting ring according to FIG. 7.

It can be seen from FIG. 9, which shows a cross-sectional view of the supporting ring 2 of FIG. 7, that the main ring 32 is interrupted in the circumferential direction U by the internal inwardly curved portions 6*b* in the wall 4, the internal inwardly curved portions 6*b* are designed in the form of circle arcs, as seen in cross section, and the wall 4 or the main ring 32, together with the internal inwardly curved portions 6*b*, has a constant material thickness in the circumferential direction U.

Figure 10:
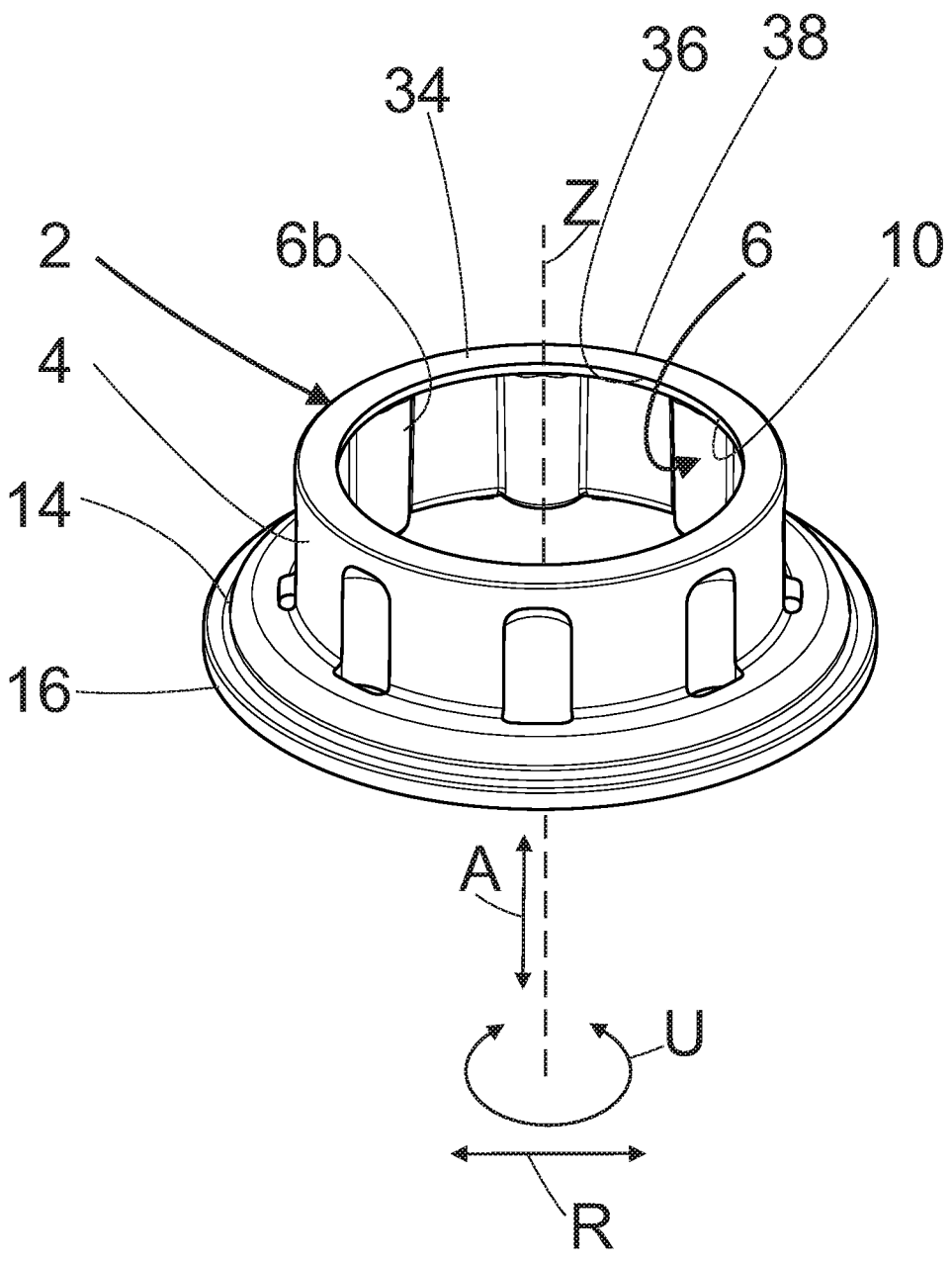
FIG. 10 shows a perspective view of a further embodiment of a supporting ring.

The view in FIG. 10 is basically similar to that in FIG. 7, although FIG. 10 has dispensed with an external-abutment geometry, which projects in the radial direction R from the wall 4. The supporting ring 2 of FIG. 10 therefore does not have any external ribs. The internal inwardly curved portions 6*b* are in the form of circle arcs, as seen in cross section.

Figure 11:
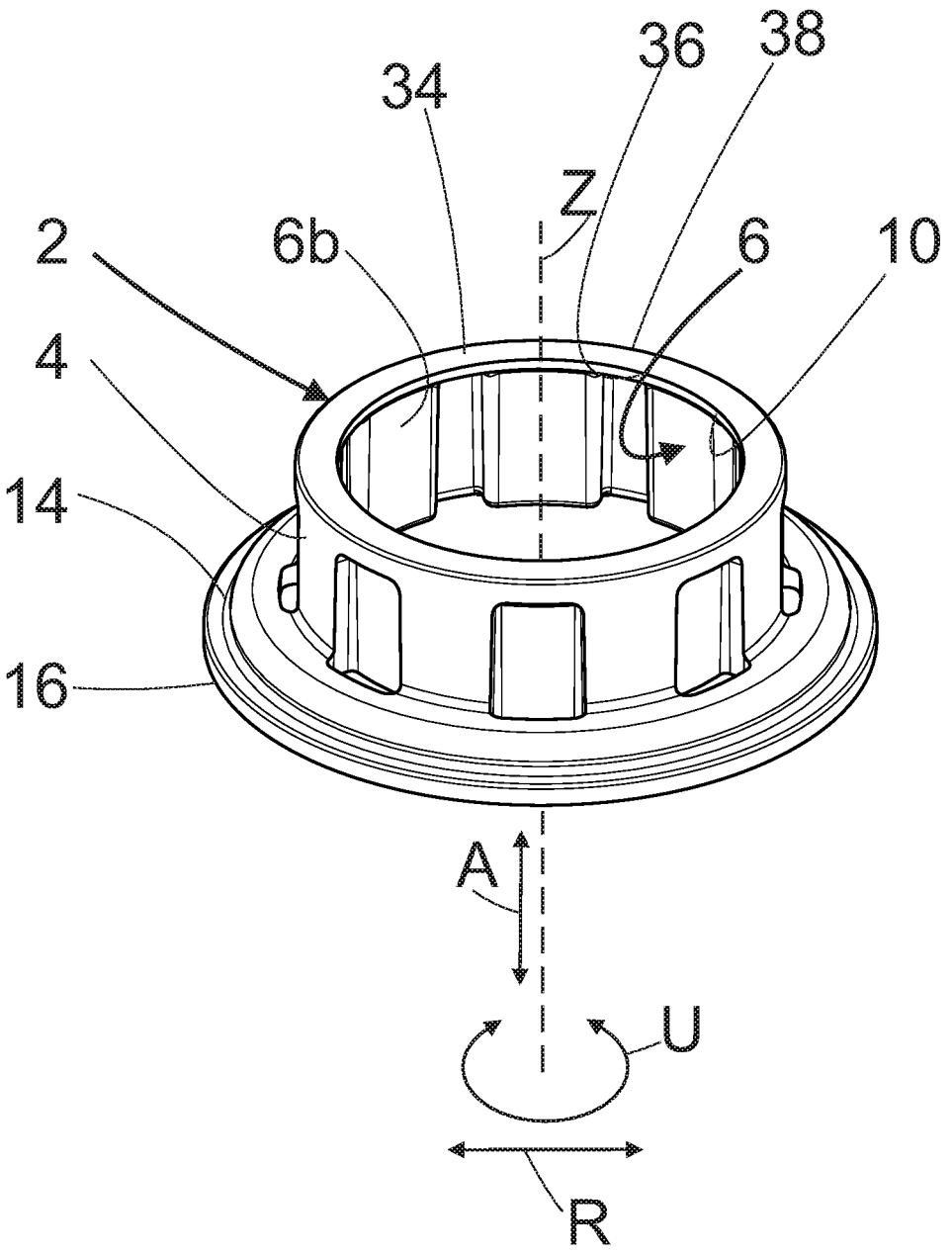
FIG. 11 shows a perspective view of a further embodiment of a supporting ring.

The view in FIG. 11 is basically similar to that in FIG. 10, although FIG. 11 has dispensed with internal inwardly curved portions 6*b* in the form of circle arcs, as seen in cross section, in favor of internal inwardly curved portions which are rectangular, as seen in cross section. The radially inner side of the rectangle follows a circular path around the central longitudinal axis Z, in order to realize a large radial-abutment surface for the damper tube 102.

Figure 12:
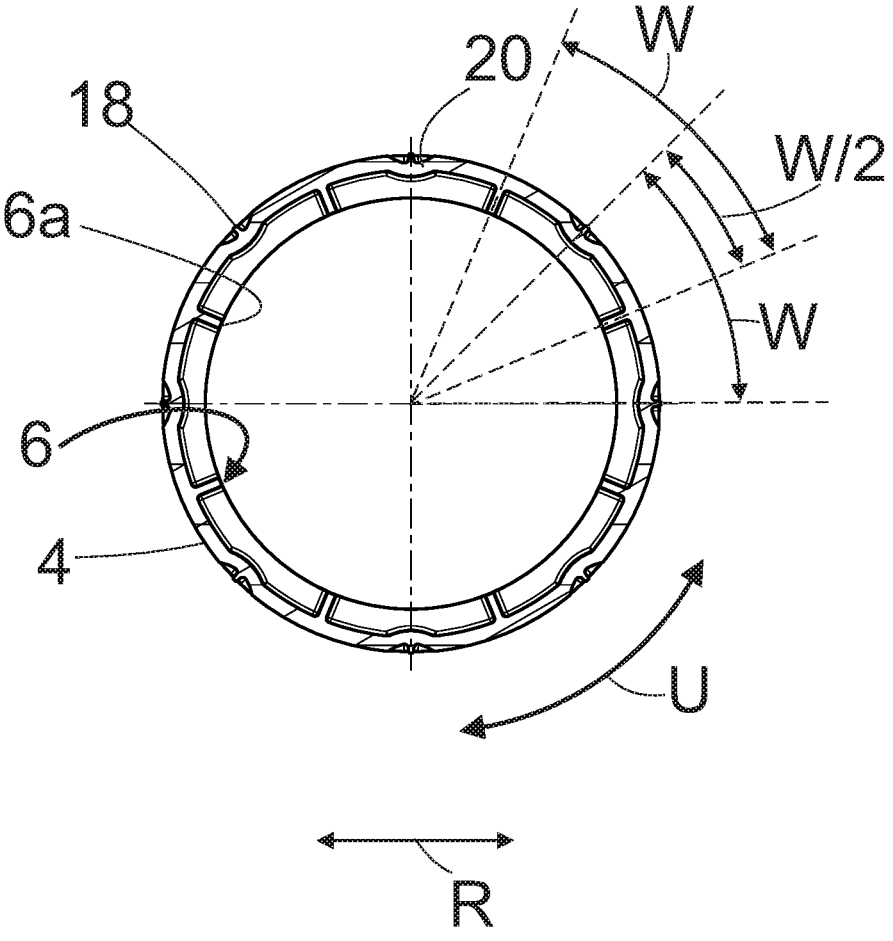
FIG. 12 shows a cross-sectional view of a further embodiment of a supporting ring.

The view in FIG. 12 is basically similar to that in FIG. 4, although in this case the abutment geometries 6, 18, rather than being in alignment in the radial direction R, are offset equidistantly in the circumferential direction U. In addition, the external ribs 18*a* are not backed in the radially inward direction—they can therefore be forced inward considerably more easily in the radial direction R between two adjacent internal ribs 6*a*. An angular extent W can be provided between the adjacent internal ribs 6*a* and an identical angular extent W can likewise be provided between the adjacent external ribs 18*a*, wherein the two angular extents W overlap by half an angular extent W/2 in the circumferential direction U.

The invention is not restricted to one of the embodiments described above, but can be modified in various ways. All of the features and advantages which can be gathered from the claims, the description and the drawing, including design details, spatial arrangements and method steps, may be essential to the invention both individually and in a wide variety of different combinations.

All combinations of at least two features disclosed in the description, the claims, and/or the figures are covered by the invention.

To avoid repetition, features disclosed in relation to a device are also considered, and can be claimed, to be disclosed in relation to a method. It is likewise the case that features disclosed in relation to a method are considered, and can be claimed, to be disclosed in relation to a device.

What it claimed:

1. A supporting ring for an air-suspension strut, comprising:
   a central longitudinal axis; and
   a wall;
   wherein, in a radially inward direction, the wall has or forms internal ribs or internal inwardly curved portions that project in a radial direction, and, in a radially outward direction, the wall has or forms external ribs that project in the radial direction; wherein respective internal ribs or internal inwardly curved portions are in alignment in the radial direction with corresponding external ribs, or the respective internal ribs or internal inwardly curved portions are offset equidistantly in a circumferential direction in relation to the corresponding external ribs; wherein both the internal ribs or internal inwardly curved portions and the external ribs run in an axial direction; and a number of internal ribs or internal inwardly curved portions is equal to a number of external ribs.

2. The supporting ring as claimed in claim 1, wherein the internal ribs or internal inwardly curved portions can be brought into abutment against a damper tube of an air-suspension strut for radial-support purposes, and/or the external ribs can be brought into abutment against a piston of an air-suspension strut for radial-support purposes.

3. The supporting ring as claimed in claim 1, wherein the supporting ring has a latching structure that is arranged continuously in the circumferential direction around the central longitudinal axis, projects in the axial direction, and can engage with a piston.

4. The supporting ring as claimed in claim 3, wherein the latching structure comprises a toothing formation.

5. The supporting ring as claimed in claim 1, wherein the supporting ring has a receiving flange that extends in the radial direction and forms an abutment surface for at least one sealing ring.

6. The supporting ring as claimed in claim 5, wherein the receiving flange has a separating device that projects in the axial direction and separates a radially external sealing-ring mount from a radially internal sealing-ring mount.

7. The supporting ring as claimed in claim 1, wherein the supporting ring has a supporting flange that extends in the radial direction from the wall to a radial edge, and a sleeve of an air-suspension strut is configured to engage around the radial edge.

8. The supporting ring as claimed in claim 1, wherein, on an outer circumference, the supporting ring has depressions that run in the axial direction.

9. The supporting ring as claimed in claim 8, wherein the depressions are open at at least one respective axial end, and/or are designed to be free of undercuts in the axial direction.

10. The supporting ring as claimed in claim 9, wherein the depressions are fully open.

11. The supporting ring as claimed in claim 1, wherein a distance is formed in the axial direction between, on one hand, the internal inwardly curved portions or the external ribs; and, on another hand, an axial wall end.

12. The supporting ring as claimed in claim 1, wherein with an aligned configuration, a radial force can be transmitted directly to the internal ribs or internal inwardly curved portions and, with an offset configuration, tolerances with surrounding components are easier to compensate for compared to said aligned configuration.

13. An assembly comprising
   the supporting ring as claimed in claim 1,
   at least one sealing ring, and
   the air-suspension strut with a damper tube,
   wherein the supporting ring butts against the damper tube of the air suspension strut via the internal ribs or internal inwardly curved portions.

14. A supporting ring for an air-suspension strut, comprising:
   a central longitudinal axis; and
   a wall;
   wherein, in a radially inward direction, the wall has or forms internal ribs or internal inwardly curved portions that project in a radial direction, and, in a radially outward direction, the wall has or forms external ribs that project in the radial direction; wherein respective internal ribs or internal inwardly curved portions are in alignment in the radial direction with corresponding external ribs, or the respective internal ribs or internal inwardly curved portions are offset equidistantly in a circumferential direction in relation to the corresponding external ribs; wherein both the internal ribs or internal inwardly curved portions and the external ribs run in an axial direction; and each external rib is either in radial alignment with a respective internal rib or internal inwardly curved portion or offset circumferentially by half an angular extent between each adjacent internal ribs.

* * * * *